United States Patent [19]
Mascola

[11] Patent Number: 5,957,443
[45] Date of Patent: Sep. 28, 1999

[54] HYDRAULIC WORK SUPPORT

[75] Inventor: James V. Mascola, Emporia, Kans.

[73] Assignee: Vektek, Inc., Emporia, Kans.

[21] Appl. No.: 09/119,415

[22] Filed: Jul. 20, 1998

[51] Int. Cl.[6] ...................................................... B23G 3/08
[52] U.S. Cl. .............................. 269/22; 269/296; 269/310
[58] Field of Search ................................. 269/22, 20, 27, 269/30, 32, 296, 309, 310; 188/67, 129

[56] References Cited

U.S. PATENT DOCUMENTS

| | | |
|---|---|---|
| 3,542,354 | 11/1970 | Fitzpatrick . |
| 3,729,185 | 4/1973 | Roeske . |
| 4,743,001 | 5/1988 | Craft . |
| 4,934,672 | 6/1990 | Craft . |
| 5,887,862 | 3/1999 | Yonezawa ................................ 269/310 |

FOREIGN PATENT DOCUMENTS

| | | |
|---|---|---|
| 1271132 | 7/1960 | France . |
| 1216183 | 12/1962 | Germany . |
| 2338903 | 8/1973 | Germany . |

*Primary Examiner*—Robert C. Watson
*Attorney, Agent, or Firm*—Hovey, Williams, Timmons & Collins

[57] ABSTRACT

An improved hydraulic work support (10) having a plunger (18) that is shifted between retracted and extended positions by hydraulic fluid is disclosed. The work support includes a base (12); a tubular housing (14) partially received in the base and having a central bore (40); a tubular sleeve (16) received within the central bore; a general cylindrical plunger (18) positioned at least partially within the sleeve, the plunger being movable within the bore along the longitudinal axis; and a piston cylinder assembly (20) positioned within the central bore for selectively shifting the plunger along the longitudinal axis of the bore between a lowered, retracted position and a raised, extended position under the influence of hydraulic fluid. The piston cylinder assembly includes a cylinder (94) positioned within the sleeve and having a piston chamber (96) formed therein; a piston (98) movably received within the piston chamber; and an elongated piston rod (100) having a lower end coupled with the piston and an opposite upper end extending from the cylinder and coupled with the plunger. The piston and piston rod are shifted upward in the piston chamber when fluid is delivered to a first fluid passageway (34) formed in the base to shift the plunger to its raised, extended position. The piston and piston rod are shifted downward in the piston chamber when fluid is delivered to a second fluid passageway (36) formed in the base to return the plunger to its lower, retracted position.

6 Claims, 2 Drawing Sheets

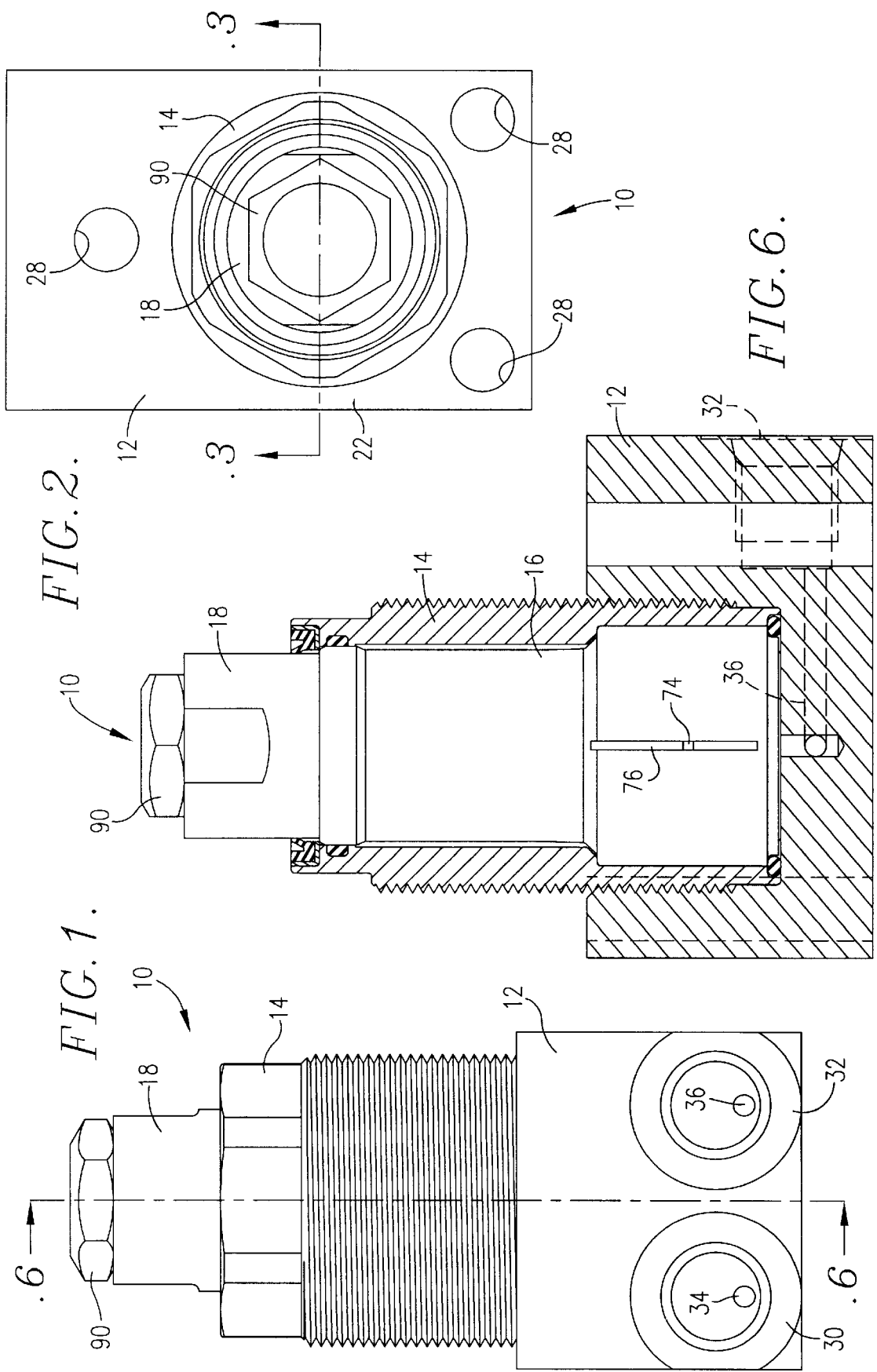

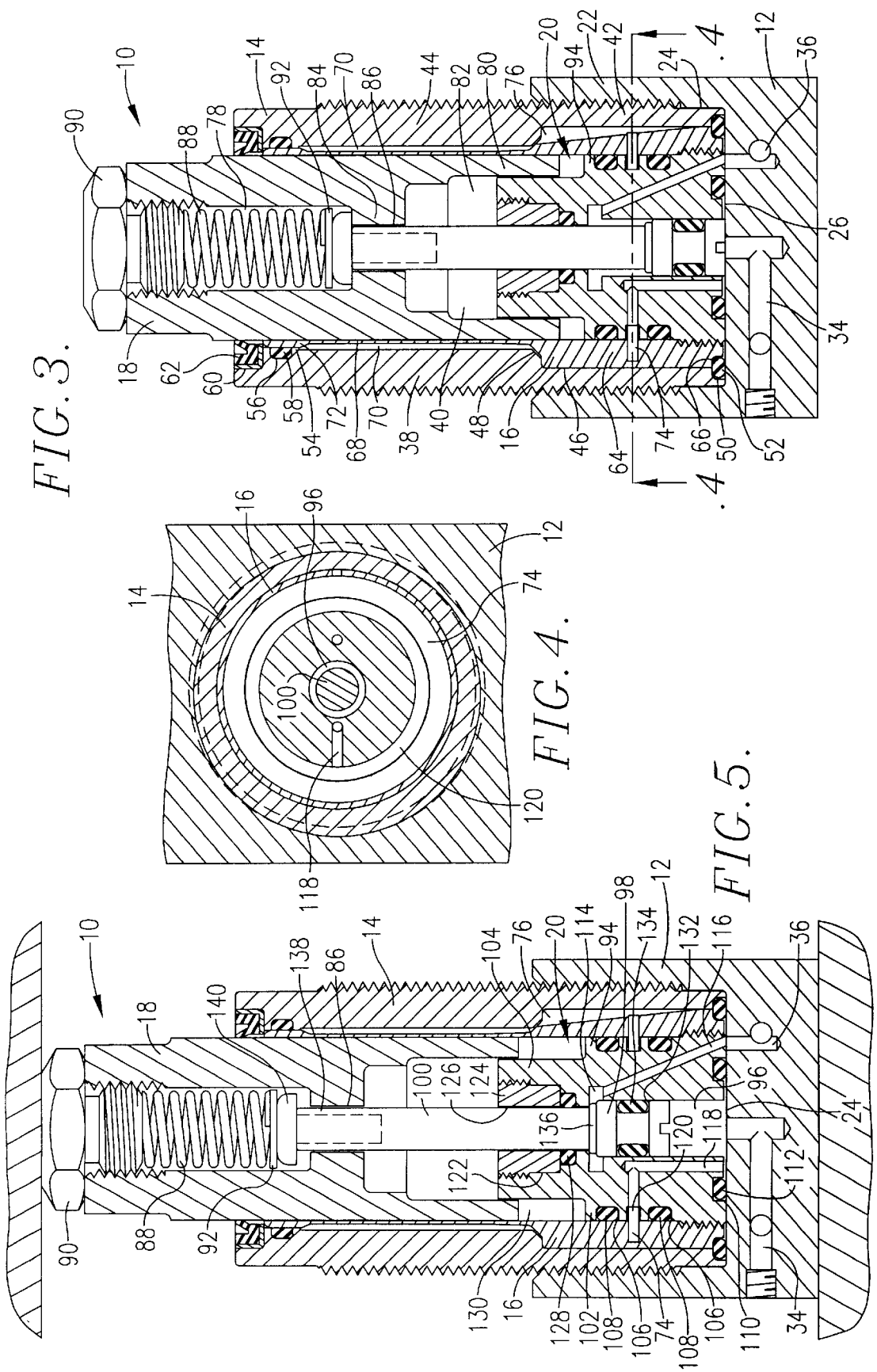

HYDRAULIC WORK SUPPORT

BACKGROUND OF THE INVENTION

1. Field of the Invention

The present invention relates to hydraulic work supports for supporting workpieces during machining or other operations. More particularly, the present invention relates to a hydraulic work support having a plunger axially shiftable within a bore of a housing and an improved piston cylinder assembly for shifting the plunger between extended and retracted positions under the influence of hydraulic fluid.

2. Description of the Prior Art

Hydraulic work supports are commonly used to support workpieces during operations thereon. Conventional work supports include a plunger axially shiftable within a bore of a housing. The plunger is shifted upward to an extended position under the influence of fluid pressure to engage the workpiece and is then returned to a lowered, retracted positions under the influence of a compression spring when the workpiece is to be released.

A problem with these types of prior art hydraulic work supports is that the return springs do not provide a controlled rate of return and tend to lose their elasticity and compressive forces after repeated uses. Prior art attempts to provide a hydraulic work support with a plunger that is shifted in both directions under the influence of fluid pressure have been largely unsuccessful due to fluid sealing problems and other problems peculiar to hydraulic work supports.

OBJECTS AND SUMMARY OF THE INVENTION

The present invention solves the above-described problems and provides a distinct advance the art of hydraulic work supports. More particularly, the present invention provides a hydraulic work support having a plunger that is shifted in both directions by hydraulic fluid.

The hydraulic work support of the present invention broadly includes a base having a recess therein; a tubular housing partially received in the recess of the base and having a central bore; a tubular sleeve received within the central bore of the housing; a general cylindrical plunger positioned at least partially within the sleeve, the plunger being movable within the bore along the longitudinal axis of the bore; and a piston cylinder assembly positioned within the sleeve and coupled with the plunger for selectively shifting the plunger along the longitudinal axis of the bore between a lowered, retracted position and a raised, extended position under the influence of hydraulic fluid.

The piston cylinder assembly includes a cylinder positioned in the sleeve and having a piston chamber formed therein; a piston movably received within the piston chamber; and an elongated piston rod having a lower end coupled with the piston and an opposite upper end extending from the cylinder and coupled with the plunger. The piston and piston rod are shifted upward in the piston chamber when fluid is delivered to a first fluid passageway formed in the base to shift the plunger to its raised, extended position. The piston and piston rod are shifted downward in the piston chamber when fluid is delivered to a second fluid passageway formed in the base to return the plunger to its lower, retracted position.

In preferred forms, the sleeve includes a deformable section that is shifted radially inward against the plunger under the influence of hydraulic fluid when the plunger reaches its fully extended position to lock the plunger in place.

BRIEF DESCRIPTION OF THE DRAWING FIGURES

A preferred embodiment of the present invention is described in detail below with reference to the attached drawing figures, wherein:

FIG. 1 is a front elevational view of a hydraulic work support constructed in accordance with a preferred embodiment of the present invention;

FIG. 2 is a top view of the hydraulic work support;

FIG. 3 is a front vertical sectional view of the hydraulic work support taken along line 3—3 of FIG. 2 and showing the plunger in its fully lowered, retracted position;

FIG. 4 is a horizontal sectional view of the hydraulic work support taken along line 4—4 of FIG. 3;

FIG. 5 is a vertical sectional view of the hydraulic work support similar to FIG. 3 except that the plunger is shown in its fully raised, extended position; and FIG. 6 is a side, vertical sectional view of the hydraulic work support taken along line 6—6 of FIG. 1.

DETAILED DESCRIPTION OF THE PREFERRED EMBODIMENTS

Turning now to the drawing figures, and particularly FIG. 3, a hydraulic work support 10 constructed in accordance with a preferred embodiment of the invention is illustrated. The work support 10 broadly includes a base 12, a tubular housing 14 supported on the base, a tubular sleeve 16 mounted within the housing, a generally cylindrical plunger 18 positioned at least partially within the sleeve, and a piston cylinder assembly broadly referred to by the numeral 20 coupled with the plunger for selectively shifting the plunger between a lowered, retracted position and a raised, extended position under the influence of hydraulic fluid.

In more detail, the base 12 is generally rectangular in shape and includes an internally threaded sidewall 22 defining a generally circular recess 24 having a bottom wall 26. As best illustrated in FIG. 2, the base includes three vertically extending mounting holes 28 for receiving bolts or other fasteners for fastening the base to a fixture, table, or other platform. Although the base is depicted and described herein as a separate component, it may also comprise an integral portion of a fixture, table, or platform.

The base 12 also includes first and second fluid inlet ports 30,32 formed in its front face as depicted in FIG. 1. The first fluid port communicates with an elongated fluid passageway 34 that, in turn, leads to an opening near the center of the bottom wall 26 of the recess 24 (FIG. 3). The second fluid inlet port communicates with a fluid passageway 36 that leads to a second opening in the bottom wall nearer the base sidewall 22. The inner walls of the first and second fluid inlet ports may be threaded for coupling with complimentary threaded hydraulic fluid lines.

The tubular housing 14 is generally cylindrical in shape and includes a sidewall 38 defining a cylindrical central bore 40 having a vertically extending longitudinal axis. The housing has a lower portion 42 that is received within the base recess 24 and an upper portion 44 that extends upwardly from the top of the base. The exterior of the sidewall 38 is threaded to engage the threading formed in the base sidewall 22 to hold the housing on the base 12.

The housing lower portion 42 includes an inner annular groove 46 that defines an annular shoulder 48 between the lower and upper portions of the housing. The lowermost end of the housing lower portion also includes an inner annular notch or cutout section 50 at its lowermost end that receives a sealing element 52 such as an O-ring.

The housing upper portion 44 includes a slightly increased thickness inwardly extending annular flange 54 near its uppermost end having an annular radial groove 56 formed therein that receives a sealing element 58 such as an O-ring. The uppermost end of the housing also includes an inner annular cutout section 60 that receives a wiping element 62 to prevent any foreign material from entering the top of the work support.

The sleeve 16 is also generally cylindrical in shape and is received within the central bore 40 of the housing 14. The sleeve includes a lower flange 64 that is received within the annular groove 46 in the housing to hold the sleeve in the housing. The lower end of the flange also includes an exterior annular cutout section 66 that cooperates with the housing cutout section 50 to support the O-ring 52. The inner wall of the lower end of the flange includes internal threading.

The sleeve 16 also includes an upper, thin-walled deformable section 68 spaced slightly inward of the inner wall of the housing 14 to define an annular fluid chamber 70 therebetween. The upper end of the deformable section includes an outwardly extending flange 72 that engages the flange 54 in the housing and the O-ring 58 to seal the top of the annular fluid chamber. As described in more detail below, when fluid is delivered to the annular fluid chamber, it exerts an inwardly directed radial force on the deformable section of the sleeve that shifts it radially inward against the plunger 18 for locking the plunger in a desired position.

The sleeve flange 64 also includes an annular fluid-receiving channel 74 (FIGS. 3 and 4) and a vertically extending groove 76 (FIGS. 3 and 6) that connects the annular channel to the annular fluid chamber 70 between the sleeve and the housing.

The plunger 18 is generally cylindrical in shape and is positioned in the sleeve 16 for movement between a lowered, retracted position (FIG. 3) and a raised, extended position (FIG. 5). The upper portion of the plunger includes a cylindrical, central bore 78 therein having an open, internally threaded upper end. The lower portion of the plunger includes a downwardly extending annular rim 80 defining a relatively larger diameter, generally cylindrical bore 82 therein having an open lower end. The midsection of the plunger includes a radially inwardly extending flange 84 that defines an opening 86 extending between the bores 78,82.

A compression spring 88 is positioned within the bore 78 of the plunger 18 and is held therein by a contact bolt 90 that is threaded into the upper end of the bore. The bottom of the spring rests on a washer 92 placed in the lower end of the bore.

The piston cylinder assembly 20 is positioned within the sleeve 16 and is coupled with the plunger 18 for selectively shifting the plunger along the longitudinal axis of the bore between its lowered and raised positions. As best illustrated in FIG. 5, the cylinder assembly includes a cylinder 94 including a sidewall defining an enclosed piston chamber 96, a piston 98 moveably received within the piston chamber, and an elongated piston rod 100 extending upwardly out of the top of the cylinder.

In more detail, the cylinder 94 is positioned within the sleeve flange 64 and includes a lower, base portion 102 and an upwardly extending, reduced diameter neck portion 104. The base portion is held in the sleeve 16 by external threading on its lowermost end that engages the internal threading on the lower end of the sleeve flange. The outer wall of the base portion includes a pair of annular grooves 106 that receive a pair of corresponding sealing elements 108 such as O-rings. The bottom wall of the base portion includes an annular groove 110 that receives a similar sealing element 112.

The piston chamber 96 has a lower end that opens to the bottom of the base recess 24 and an opposite, upper end that includes a radially enlarged area 114. The lower, open end of the piston chamber is in fluid communication with the fluid passageway 34 leading to the first fluid inlet port 30. The upper end of the piston chamber is in fluid communication with a fluid passageway 116 formed diagonally through the cylinder that is in turn in fluid communication with the passageway 36 leading to the second fluid inlet port 32.

The base portion 102 of the cylinder further includes a fluid passageway 118 and a connecting annular channel 120 that connect the lower end of the piston chamber 96 to the annular channel 74 formed in the sleeve. As described above, the annular channel 74 is in fluid communication with the vertical groove 76 in the sleeve, which connects to the annular fluid chamber 70 between the deformable section of the sleeve 68 and the inner wall of the housing 14. Thus, fluid that enters the lower end of the piston chamber 96 through the first fluid inlet port 30 travels up the passageway 118, through the annular channel 120, the annular channel 74, and the vertical groove 76, and to the annular fluid chamber 70 as described in more detail below.

The cylinder neck 104 includes an open top, internally threaded bore 122. A threaded plug 124 having a central bore 126 formed therethrough is threaded into the open top of the bore 122 to hold a seal 128 therein. The cylinder neck, which is reduced in diameter relative to the cylinder base 102, defines an annular opening 130 between the cylinder and the inner wall of the sleeve for receiving the lower annular rim 80 of the plunger 18 when the plunger is shifted to its lowered position.

The piston 98 is movably received within the piston chamber 96 and includes a central annular channel 132 that receives an O-ring or other sealing element 134.

The piston rod 100 includes a lower end 136 attached to the upper end of the piston 98 and an opposite upper end 138 that extends through the plug bore 126 and the opening 86 in the plunger 18. A cap screw 140 is threaded into the upper end of the piston rod so that it is in contact with the washer 92 supporting the lower end of the compression spring 88.

In operation, the work support 10 is mounted on a fixture, table, or other platform and hydraulic fluid lines are connected to the first and second fluid ports 30,32 to deliver fluid to and discharge fluid from the passageways 34,36 in communication with the piston chamber 96. The work support is typically initially in the state illustrated in FIG. 3., wherein the plunger 18 is in its lowered, retracted position.

To raise the plunger 18 to support a workpiece 142 as illustrated in FIG. 5, fluid is delivered to the first fluid port 30 to pressurize the lower end of the piston chamber 96 with fluid and fluid is allowed to be discharged from the second fluid port 32 to drain the upper end of the piston chamber. The fluid entering the lower end of the piston chamber exerts an upward force on the lower face of the piston 98, thereby shifting the piston upwardly in the piston chamber. This raises the piston rod 100, which in turn pushes upwardly against the lower end of the compression spring 88. As long as the contact bolt 90 on the top of the plunger has not contacted the workpiece or other object, the spring remains essentially fully expanded and transfers the upward force from the piston rod to the plunger to raise the plunger. Once the contact bolt contacts the workpiece and stops, however, the piston rod continues to rise to slightly compress the spring. This provides a cushioning effect so that the contact bolt firmly holds the workpiece without marring or otherwise damaging the surface of the workpiece.

While the piston rod 100 is shifting the plunger 18 towards its fully extended position, fluid also travels from the lower end of the piston chamber 96, up the passageway 118, through the annular channel 100 in the cylinder, through the annular channel 74 and vertical groove 76 in the sleeve flange 64, and to the annular fluid chamber 70 between the deformable section 68 of the sleeve and the inner wall of the housing. As the pressure of the fluid in the annular fluid chamber increases, it exerts a radial pressure on the deformable section of the sleeve, thereby causing it to shift radially inward against the plunger 18 for locking the plunger in its fully extended position. The passageway, channels, and groove that deliver fluid to the annular fluid chamber are sized to deliver sufficient fluid to cause the deformable section to shift inward only after the piston assembly has fully extended the plunger to its raised position to prevent the plunger from locking in an intermediate position.

When it is desired to release the workpiece 142, hydraulic fluid is delivered to the upper end of the piston chamber 96 through the second fluid inlet port 32 and fluid is allowed to discharge from the lower end of the piston chamber through the first fluid inlet port 30. This reduces the fluid pressure in the lower end of the piston chamber and the annular fluid chamber 70, thus allowing the deformable section 68 of the sleeve 16 to flex outward back to its original position to release its grip on the plunger 18. Additionally, the compression spring 88 expands to its original position and pushes the piston rod 100 down slightly so that the cap screw 140 attached to the upper end of the piston rod seats itself against the flange 84 in the plunger as illustrated in FIG. 3. At the same time, the fluid entering the upper end of the piston chamber exerts a downward force on the upper end of the piston 98 to shift the piston, piston rod 100, and plunger 18 to their lowermost position as illustrated in FIG. 3, thus releasing the workpiece.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A hydraulic work support assembly for supporting a workpiece comprising:
   a base having a sidewall defining a recess therein and including first and second fluid passageways for coupling with sources of fluid;
   a tubular housing having a sidewall defining a generally cylindrical central bore presenting a longitudinal axis, the sidewall of the housing including an end portion received in said recess;
   a tubular sleeve received within the bore;
   a general cylindrical plunger positioned at least partially within the sleeve, the plunger being movable within the bore along the longitudinal axis; and
   a piston cylinder assembly positioned within the sleeve for selectively shifting the plunger within the bore along the longitudinal axis between a lowered, retracted position and a raised, extended position, the piston cylinder assembly including
      a cylinder positioned within the sleeve, the cylinder having interior walls defining a piston chamber, the piston chamber having a lower end in fluid communication with the first fluid passageway of the base and an opposite upper end, the cylinder further including a fluid passageway formed therein between the second fluid passageway of the base and the upper end of the piston chamber,
      a piston movably received within the piston chamber, and
      an elongated piston rod having a lower end coupled with the piston and an opposite upper end extending from the cylinder and coupled with the plunger.

2. The work support assembly as set forth in claim 1, wherein the piston and the piston rod are shifted upward in the piston chamber when fluid is delivered to the first fluid passageway in the base to shift the plunger to its raised, extended position and the piston and piston rod are shifted downward in the piston chamber when fluid is delivered to the second fluid passageway in the base to return the plunger to its lowered, retracted position.

3. The work support assembly as set forth in claim 1, the sleeve including a thin-walled, deformable section spaced slightly inward from the sidewall of the housing to define an annular chamber between the sleeve and the housing.

4. The work support assembly as set forth in claim 3, the cylinder further including a fluid passageway formed therein in fluid communication with the piston chamber and the annular chamber for delivering fluid from the piston chamber to the annular chamber for exerting radial pressure on the sleeve, thereby causing the deformable section of the sleeve to shift radially inward against the plunger for locking the plunger in position.

5. The work support assembly as set forth in claim 1, the plunger including a bore formed therein and a compression spring positioned within the bore, the spring having a lower end coupled with the upper end of the piston rod, wherein the piston rod compresses the spring during the upward travel of the piston rod for cushioning the contact between the plunger and the workpiece, and wherein the spring shifts the piston rod downward during the downward travel of the piston rod.

6. The work support assembly as set forth in claim 5, further including a contact bolt threaded into the upper end of the plunger for retaining the spring in the bore formed in the plunger and for contacting the workpiece when the plunger is shifted to the raised, extended position.

\* \* \* \* \*